United States Patent
Zhou et al.

(10) Patent No.: US 10,402,118 B2
(45) Date of Patent: Sep. 3, 2019

(54) METHODS FOR ATOMIC WRITES IN AN SSD (SOLID STATE DISK) SYSTEM AND APPARATUSES USING THE SAME

(71) Applicant: Shannon Systems Ltd., Shanghai (CN)

(72) Inventors: Zhen Zhou, Shanghai (CN); Ningzhong Miao, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 317 days.

(21) Appl. No.: 15/354,082

(22) Filed: Nov. 17, 2016

(65) Prior Publication Data
US 2018/0067691 A1 Mar. 8, 2018

(30) Foreign Application Priority Data
Sep. 5, 2016 (CN) .......................... 2016 1 0801521

(51) Int. Cl.
*G06F 12/00* (2006.01)
*G06F 3/06* (2006.01)
*G06F 11/07* (2006.01)
*G06F 13/00* (2006.01)
*G06F 13/28* (2006.01)

(52) U.S. Cl.
CPC .......... *G06F 3/0656* (2013.01); *G06F 3/0619* (2013.01); *G06F 3/0659* (2013.01); *G06F 3/0679* (2013.01); *G06F 3/0688* (2013.01); *G06F 11/07* (2013.01)

(58) Field of Classification Search
CPC ............. G06F 17/30371; G06F 3/0659; G06F 11/1474; G06F 12/0238; G06F 13/1673; G06F 2212/2022
See application file for complete search history.

(56) References Cited

U.S. PATENT DOCUMENTS

| | | | |
|---|---|---|---|
| 8,295,080 B2 | 10/2012 | Aizawa et al. | |
| 9,098,462 B1* | 8/2015 | McNicholl | .......... G06F 13/1631 |
| 9,110,832 B2 | 8/2015 | Feeley et al. | |
| 2005/0251617 A1* | 11/2005 | Sinclair | .................... G06F 3/061 |
| | | | 711/103 |
| 2008/0123503 A1 | 5/2008 | Achanta et al. | |
| 2008/0281886 A1 | 11/2008 | Petrank et al. | |

(Continued)

FOREIGN PATENT DOCUMENTS

TW 201106354 A1 2/2011
TW 201110438 A 3/2011

*Primary Examiner* — Mark A Giardino, Jr.
(74) *Attorney, Agent, or Firm* — McClure, Qualey & Rodack, LLP (57) ABSTRACT

The invention introduces a method for atomic writes in an SSD (Solid State Disk) system, performed by a processing unit, including at least the following steps. An atomic-write command instructing the processing unit to write first data whose length is less than a page length in a storage unit is received. When it is determined that the atomic-write command will trigger a cross-page buffering of a buffer, dummy data is filled into all available sub-regions of a first region of the buffer, and the first data is stored in a second region of the buffer. After the first data is successfully stored in the second region of the buffer, a safe pointer is modified to point to the end address of the last sub-region of the second region, which stores the first data.

16 Claims, 9 Drawing Sheets

(56) References Cited

U.S. PATENT DOCUMENTS

2013/0097369 A1* 4/2013 Talagala .............. G06F 12/0246
 711/103
2013/0191565 A1* 7/2013 Tal .......................... G06F 3/061
 710/74

* cited by examiner

FIG. 7D

METHODS FOR ATOMIC WRITES IN AN SSD (SOLID STATE DISK) SYSTEM AND APPARATUSES USING THE SAME

CROSS REFERENCE TO RELATED APPLICATIONS

This Application claims priority of China Patent Application No. 201610801521.6, filed on Sep. 5, 2016, the entirety of which is incorporated by reference herein.

BACKGROUND

Technical Field

The present invention relates to flash memory, and in particular to methods for atomic writes in an SSD (Solid State Disk) system and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest unit of flash memory that can be written in a single operation) or a block (the smallest unit of flash memory that can be erased in a single operation), and not a single byte or word. In reality, the NAND flash device always reads complete pages from the memory cells and writes complete pages to the memory cells. After a page of data is read from the array into a buffer inside the device, the host can access the data bytes or words one by one by serially clocking them out using a strobe signal.

Atomic write is an important feature of the storage system for applications such as databases. The requirement of the data integrity for a database is ACID (Atomicity, Consistency, Isolation, Durability). Atomicity ensures that each modification to the database is either committed as a whole or does not exist at all, even in the event of an exceptional power loss. To fulfill the requirements of the database, the data programming to an SSD system needs to guarantee the atomic write. Accordingly, what is needed are methods for atomic writes in an SSD (Solid State Disk) system and apparatuses using the same.

BRIEF SUMMARY

An embodiment of the invention introduces a method for atomic writes in an SSD (Solid State Disk) system, performed by a processing unit, including at least the following steps. An atomic-write command instructing the processing unit to write first data whose length is less than a page length in a storage unit is received. When it is determined that the atomic-write command will trigger a cross-page buffering of a buffer, dummy data is filled into all available sub-regions of a first region of the buffer, and the first data is stored in a second region of the buffer. After the first data is successfully stored in the second region of the buffer, a safe pointer is modified to point to the end address of the last sub-region of the second region, which stores the first data.

An embodiment of the invention introduces an apparatus for atomic writes in an SSD system at least containing a buffer controller and a processing unit. The buffer controller is coupled to a storage unit via an access interface. The processing unit receives an atomic-write command from a host device, which instructs to write first data whose length is less than a page length in the storage unit. When determining that the atomic-write command will trigger a cross-page buffering of a buffer, the processing unit directs the buffer controller to fill dummy data into all available sub-regions of a first region of the buffer, and directs the buffer controller to store the first data in a second region of the buffer. After successfully storing the first data in the second region of the buffer, the buffer controller modifies a safe pointer to point to the end address of the last sub-region of the second region, which stores the first data.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
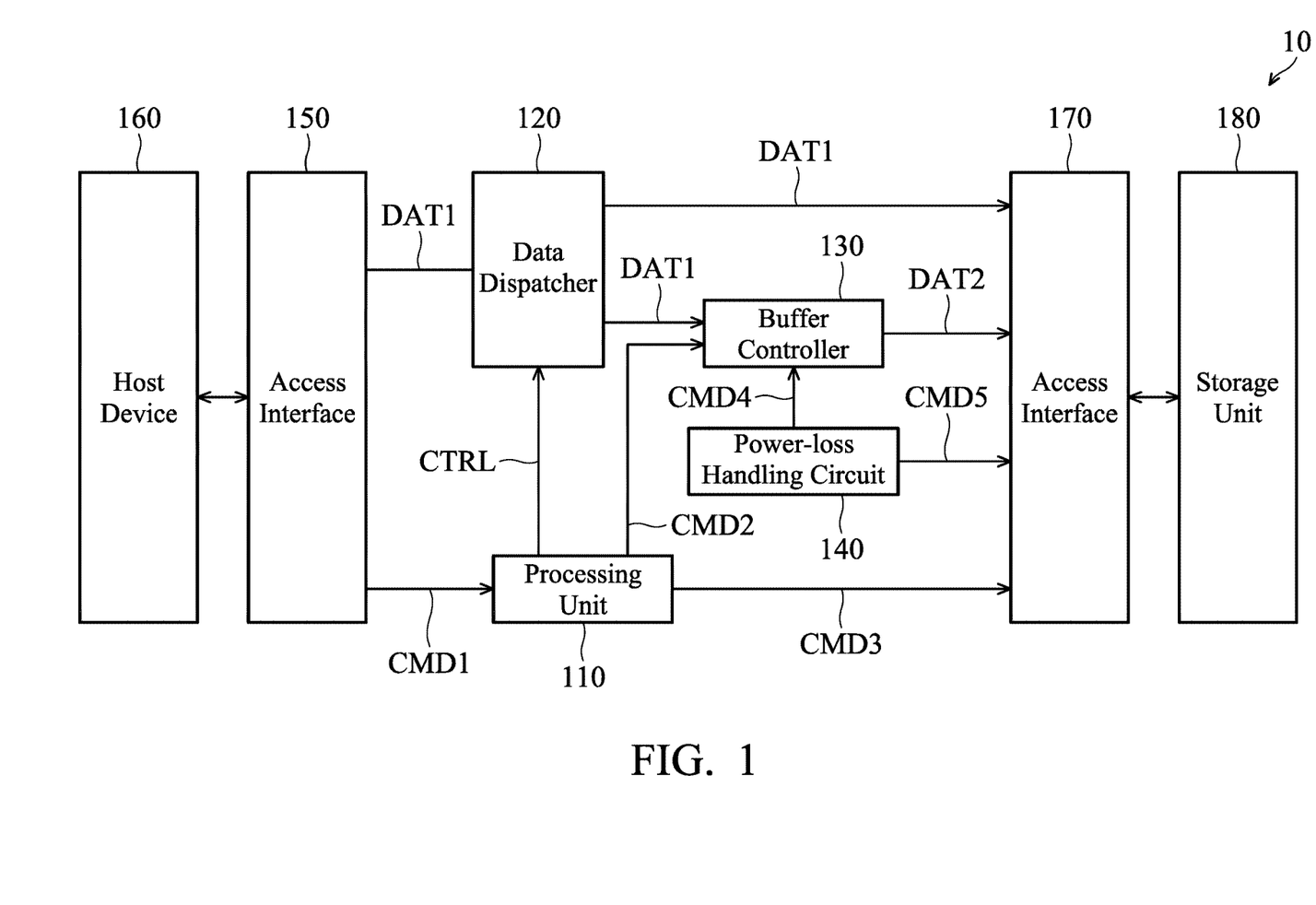
FIG. 1 is the system architecture of a flash memory according to an embodiment of the invention.

FIG. 1 is the system architecture of a flash memory according to an embodiment of the invention. The system architecture of the flash memory 10 contains a processing unit 110 configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The processing unit 110 may contain one or more ALUs (Arithmetic and Logic Units) and bit shifters. The Arithmetic and Logic Unit is responsible for performing boolean operations (such as, AND, OR, NOT, NAND, NOR, XOR, XNOR, etc.) and also for performing integer addition and subtraction. The bit shifter is responsible for shift and rotations. The system architecture of the flash memory 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
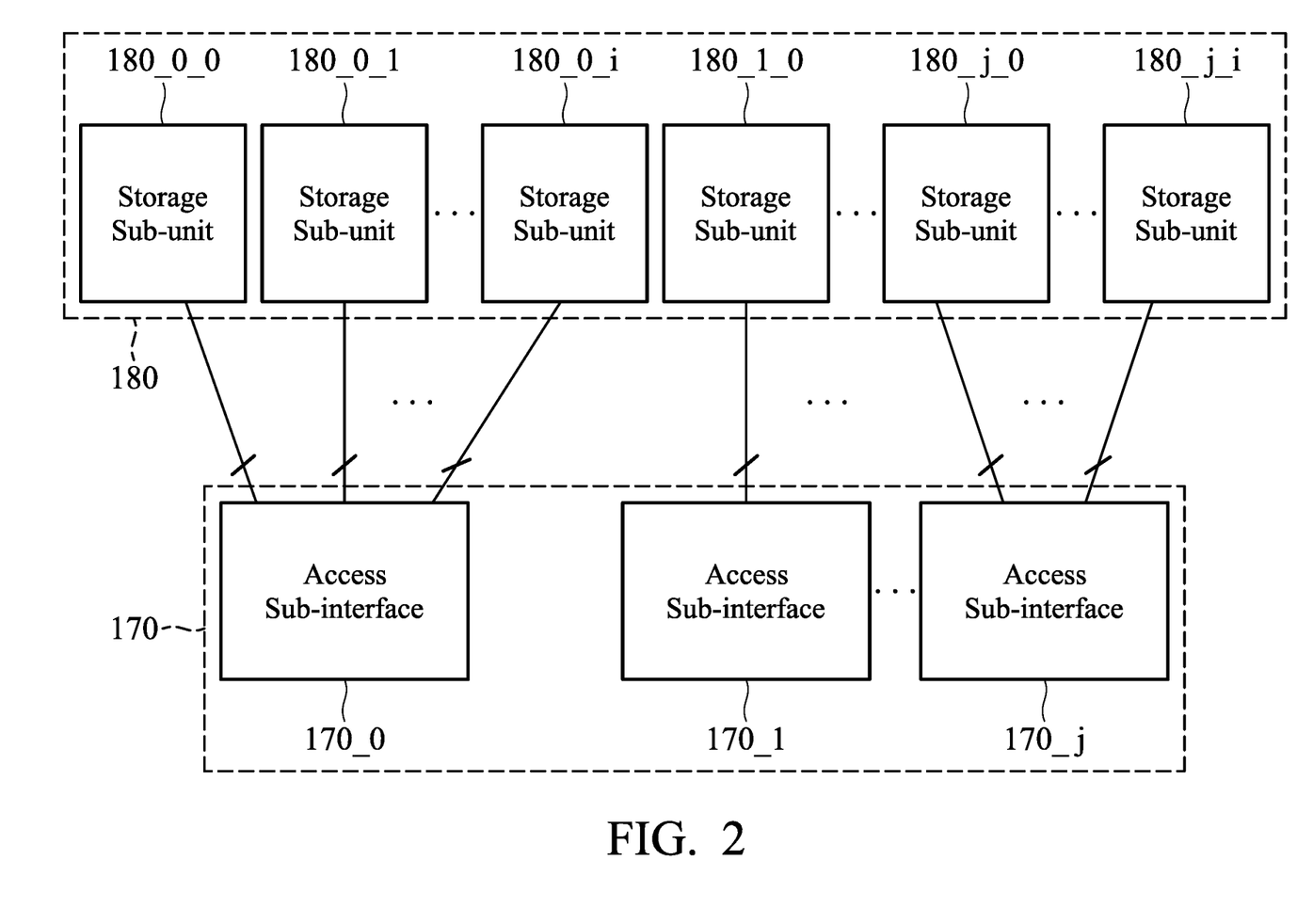
FIG. 2 is a schematic diagram illustrating interfaces to storage units of a flash storage according to an embodiment of the invention.
Figure 3:
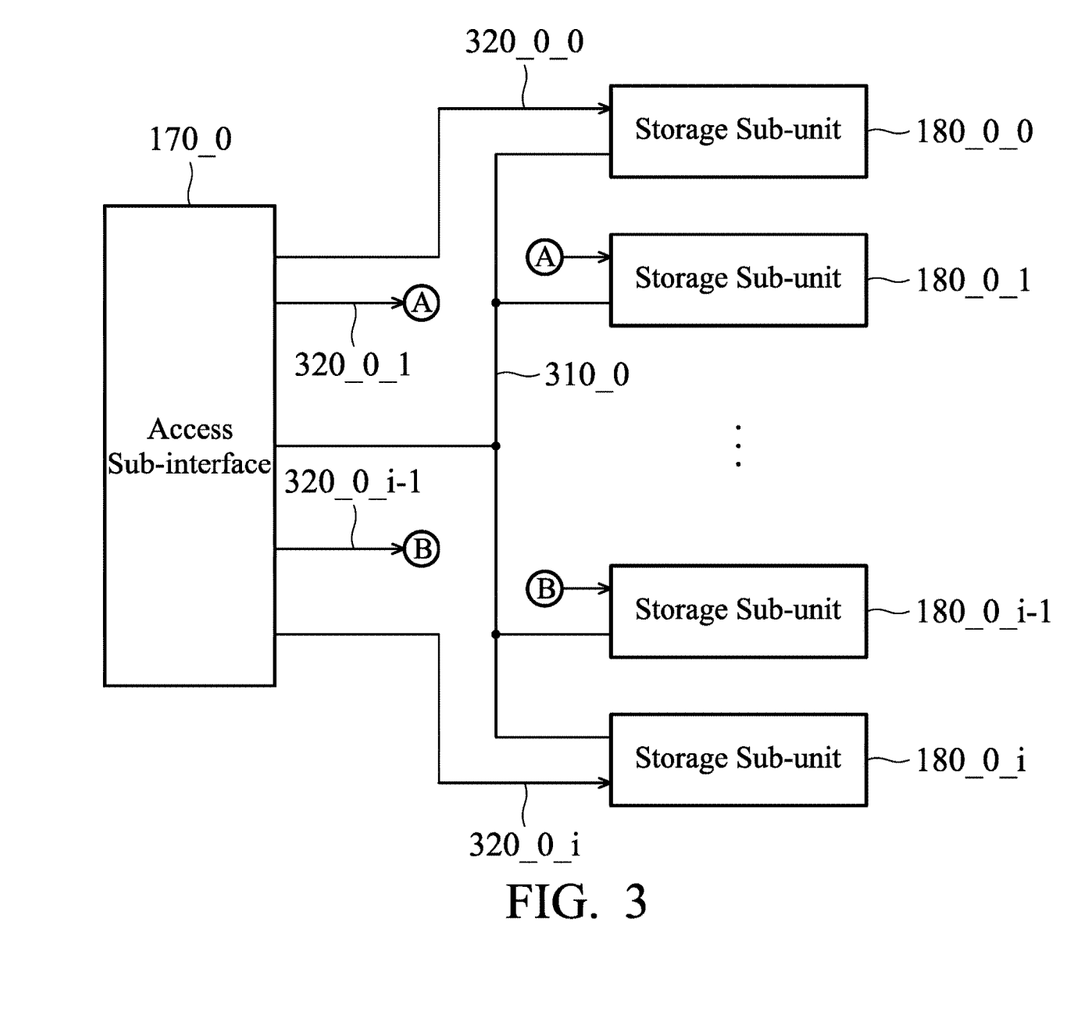
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use a respective access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then program data into the designated location of the selected storage sub-unit via the shared data line 310_0.

Figure 4:
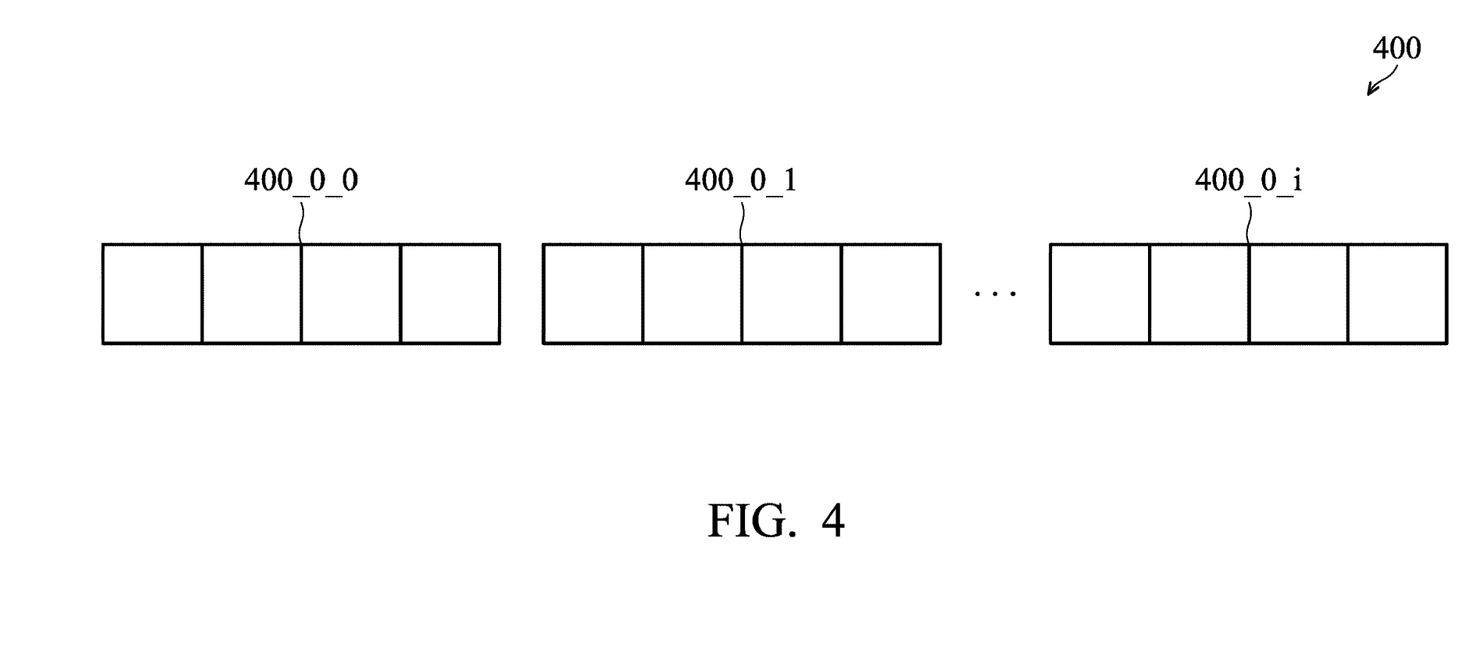
FIG. 4 is a schematic diagram illustrating a buffer according to an embodiment of the invention.

The processing unit 110 may use one of two modes to direct the access interface 170 to program data: One is direct write; and the other is buffered write. When a write command CMD1 issued by the host device 160 instructs to write data whose length exceeds one page length, the processing unit 110 enters the direct write mode. Assume that the length of one page is 16K bytes: When determining that a write command CMD1 issued by the host device 160 instructs to write data whose length exceeds 16K bytes, the processing unit 110 uses the direct write mode to program data. It should be noted that, if a data length to be programed is less than a multiple of one page length (such as nxp data, where n represents the number of pages and p represents the data length of one page), the spare space is filled with dummy data. Specifically, in the direct write mode, the processing unit 110 issues a control signal CTRL to direct a data dispatcher 120 to send data DAT1 to the access interface 170 and issues a command CMD3 to direct the access interface 170 to program the data DAT1 into a designated address of the storage unit 180. When determining that a write command CMD1 issued by the host device 160 instructs to write data whose length is less than 16K bytes, the processing unit 110 enters the buffered write mode. Specifically, in the buffered write mode, the processing unit 110 issues a control signal CTRL to direct the data dispatcher 120 to send data DAT1 to a buffer controller 130 and issues a command CMD2 to direct the buffer controller 130 to store the data DAT1 in a designated region of a buffer. Subsequently, after data of the buffer is collected to one page length, the processing unit 110 issues a command CMD2 to direct the buffer controller 130 to output data DAT2 of a designated region of the buffer to the access interface 170, and then issues a command CMD3 to direct the access interface 170 to program the data DAT2 into a designated address of the storage unit 180. The data dispatcher 120 may be practiced in a de-multiplexer to couple the data line of the access interface 150 to either the buffer controller 130 or the access interface 170 according to the control signal CTRL. FIG. 4 is a schematic diagram illustrating a buffer according to an embodiment of the invention. The allocated regions of the buffer conform to the disposition of the storage unit 180. For example, the buffer contains regions 400_0_0 to 400_0_i and each region is associated with a respective one of the storage sub-units 180_0_0 to 180_0_i. Specifically, the region 400_0_0 is configured to temporarily store one page of data to be programed into the storage sub-unit 180_0_0, the region 400_0_1 is configured to temporarily store one page of data to be programmed into the storage sub-unit 180_0_1, and so on. Each region may contain four sub-regions to store four units of data, respectively, and each unit has a fixed length, such as 4K bytes. It should be noted that the quantity of sub-regions contained in each region can be adjusted depending on different design requirements, and the invention should not be limited thereto.

Figure 5A:
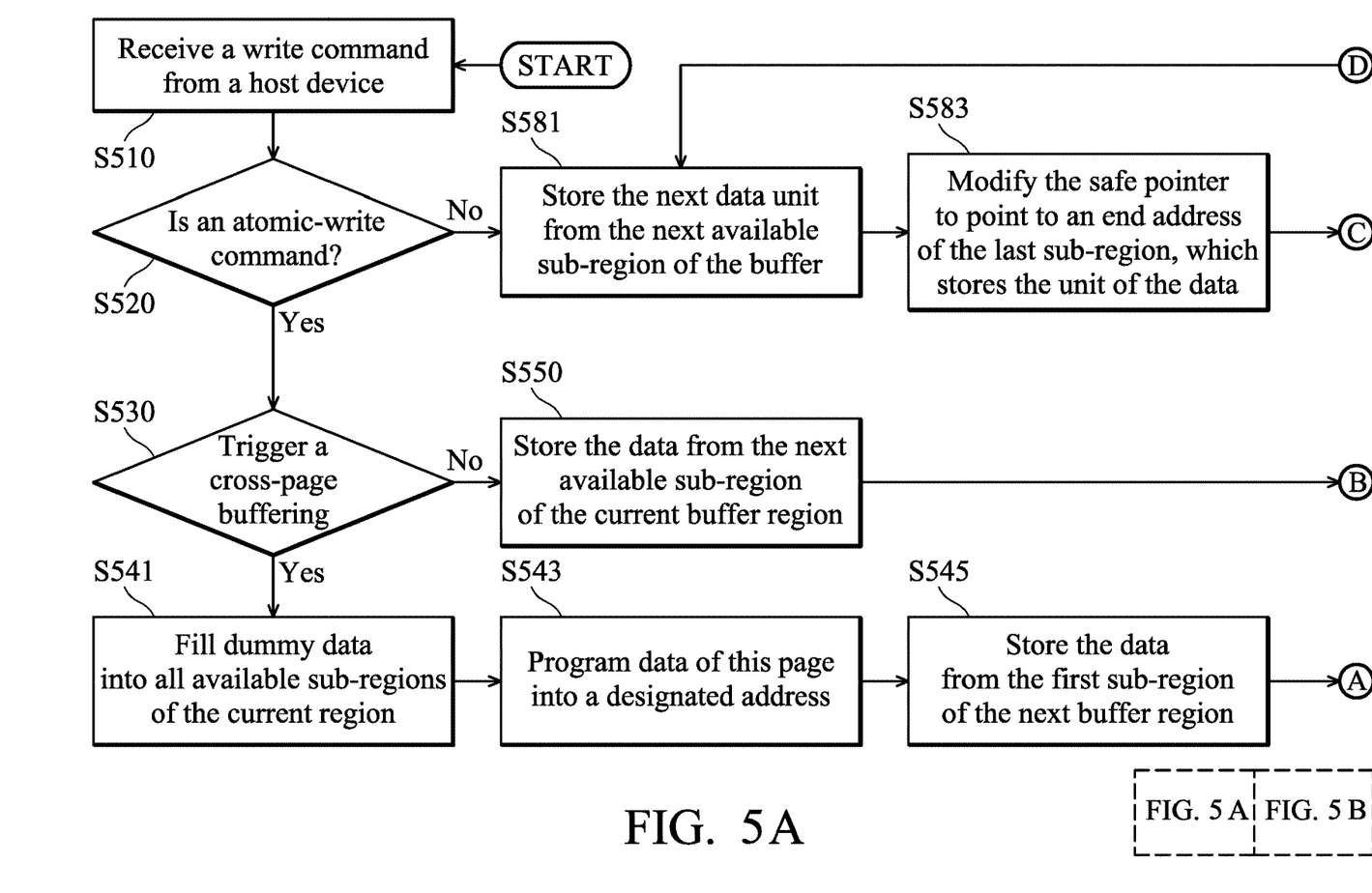
FIGS. 5A and 5B are flowcharts illustrating a method for atomic writes in an SSD system according to an embodiment of the invention.
Figure 5B:
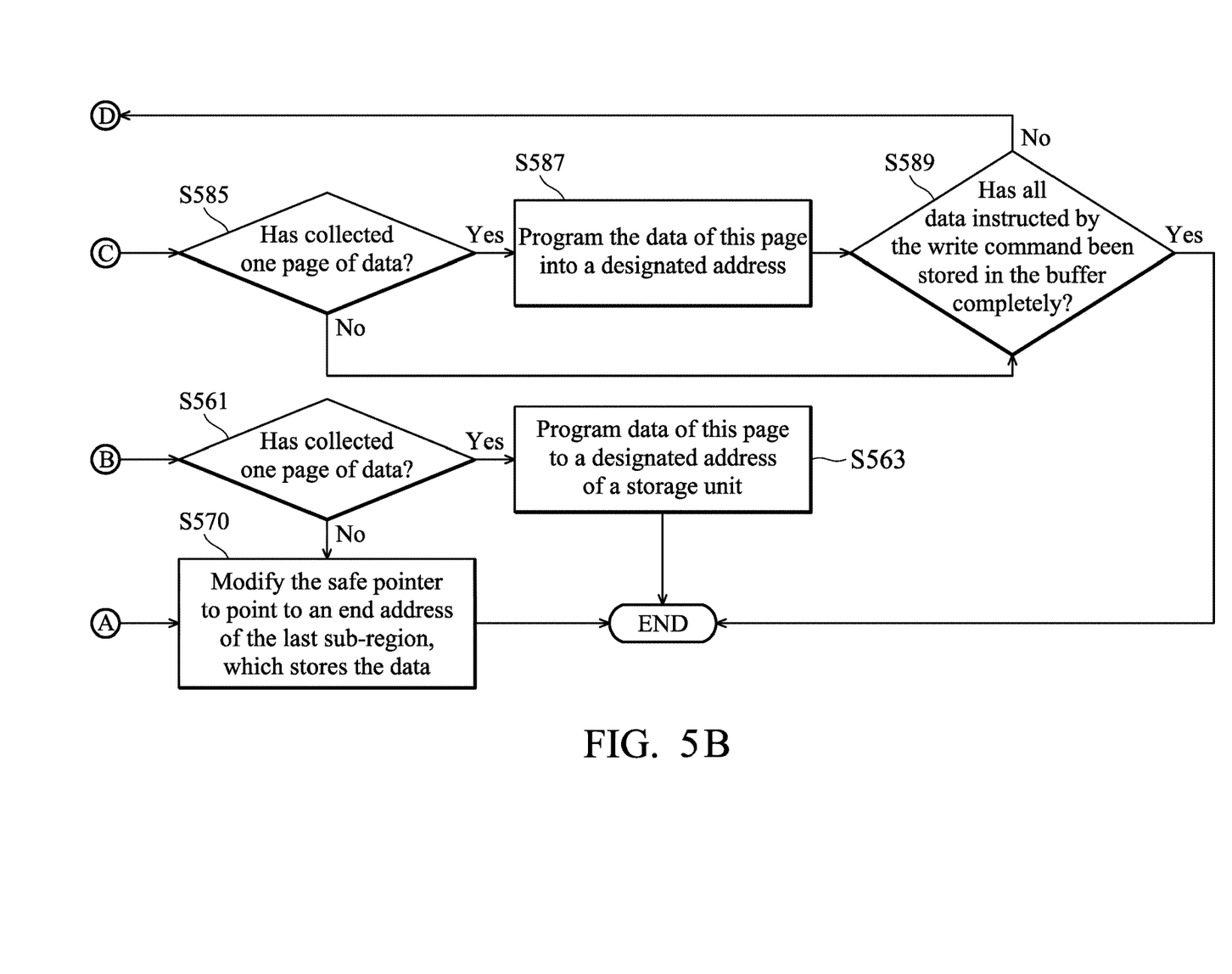

FIGS. 5A and 5B are flowcharts illustrating a method for atomic writes in an SSD system according to an embodiment of the invention. In the buffered write mode, the method is performed by the processing unit 110 when loading and executing relevant firmware or software routines to move less than one page of data to a designated region of the buffer 400. First, the processing unit 110 receives a write command CMD1 from the host device 160 via the access interface 150, which includes information indicating whether it is an atomic write (step S510). When determining that the write command CMD1 is an atomic write (the "Yes" path of step S520), the processing unit 110 performs an atomic write procedure (steps S530 to S570). Otherwise (the "No" path of step S520), the processing unit 110 performs a non-atomic write procedure (step S581 to S589).

A loop is repeatedly preformed in the non-atomic write procedure to store data in available space of the buffer 400 unit by unit. In each iteration, the processing unit 110 directs the data dispatcher 120 to send data DAT1 to the buffer controller 130 and directs the buffer controller 130 to store one unit of the data DAT1 from the next available sub-region of the buffer (step S581), and after the unit of the data DAT1 is successfully stored, the buffer controller 130 modifies a safe pointer to point to the end address of the last sub-region, which stores the unit of the data DAT1 (step S583). It should be noted that the safe pointer may be stored in a register of the buffer controller 130. The functionality of the safe pointer will be described in the following paragraphs. Next, it is determined whether the buffer has collected one page of data (step S585). In step S585, the processing unit 110 may determine whether this sub-region is the last sub-region of a region. If so, it is determined that the buffer has collected one page of data. When the buffer has collected one page of data (the "Yes" path of step S585), the processing unit 110 directs the buffer controller 130 to output data DAT2 of this page to the access interface 170 and directs the access interface 170 to program the data DAT2 of this page into a designated address of the storage unit 180, such as a designated block of a designated storage sub-unit (step S587), and then, determines whether all data instructed by the write command CMD1 has been stored in the buffer completely (step S589). When the buffer has not collected one page of data (the "No" path of step S585), the processing unit 110 determines whether all data instructed by the write command CMD1 has been stored in the buffer completely (step S589). When all data instructed by the write command CMD1 has not been stored in the buffer completely (the "No" path of step S589), the processing unit 110 continues to store the next data unit from the next available sub-region of the buffer (step S581). Otherwise, the whole process ends.

The atomic write procedure first determines whether the write command CMD1 triggers a cross-page buffering (step S530). In step S530, the processing unit 110 may determine whether the quantity of available sub-regions of the current region is less than the quantity of data units instructed by the write command CMD1. In a conventional way to deal with to the situation, the data instructed by the write command CMD1 will be divided into two pieces and the two pieces of data will be stored in two respective regions of the buffer. However, it may violate the atomic write in some situations.

When a cross-page buffering is triggered (the "Yes" path of step S530), the processing unit 110 directs the buffer controller to fill dummy data into all available sub-regions of the current region (step S541), directs the buffer controller 130 to output the data DAT2 of this page to the access interface 170 and directs the access interface 170 to program the data DAT2 of this page into a designated address, for example, a designated block of a designated storage sub-unit (step S543), and directs the data dispatcher 120 to send the data DAT1 to the buffer controller 130 and directs the buffer controller 130 to store the data DAT1 from the first sub-region of the next buffer region (step S545). After the data DAT1 is stored in the buffer successfully, the buffer controller 130 modifies the safe pointer to point to the end address of the last sub-region, which stores the data DAT1 (step S570).

When a cross-page buffering is not triggered (the "No" path of step S530), the processing unit 110 directs the data dispatcher 120 to send the data DAT1 to the buffer controller 130 and directs the buffer controller 130 to store the data DAT1 from the next available sub-region of the current buffer region (step S550) and determines whether the buffer has collected one page of data (step S561). For details of step S561, one may refer to the description of step S585, which is not repeated, for brevity. When the buffer has collected one page of data (the "Yes" path of step S561), the processing unit 110 directs the buffer controller 130 to output the data DAT2 of this page to the access interface 10 and directs the access interface 170 to program the data DAT2 of this page to a designated address of the storage unit 180 (step S563). When the buffer has not collected one page of data (the "No" path of step S561), the buffer controller 130 modifies the safe pointer to point to the end address of the last sub-region, which stores the data DAT1, subsequent to a success of buffering the data DAT1 (step S570).

In steps S543, S563 and S587, the safe pointer is cleared after the data DAT2 of this page is programmed into a designated address of the storage unit 180.

Figure 6:
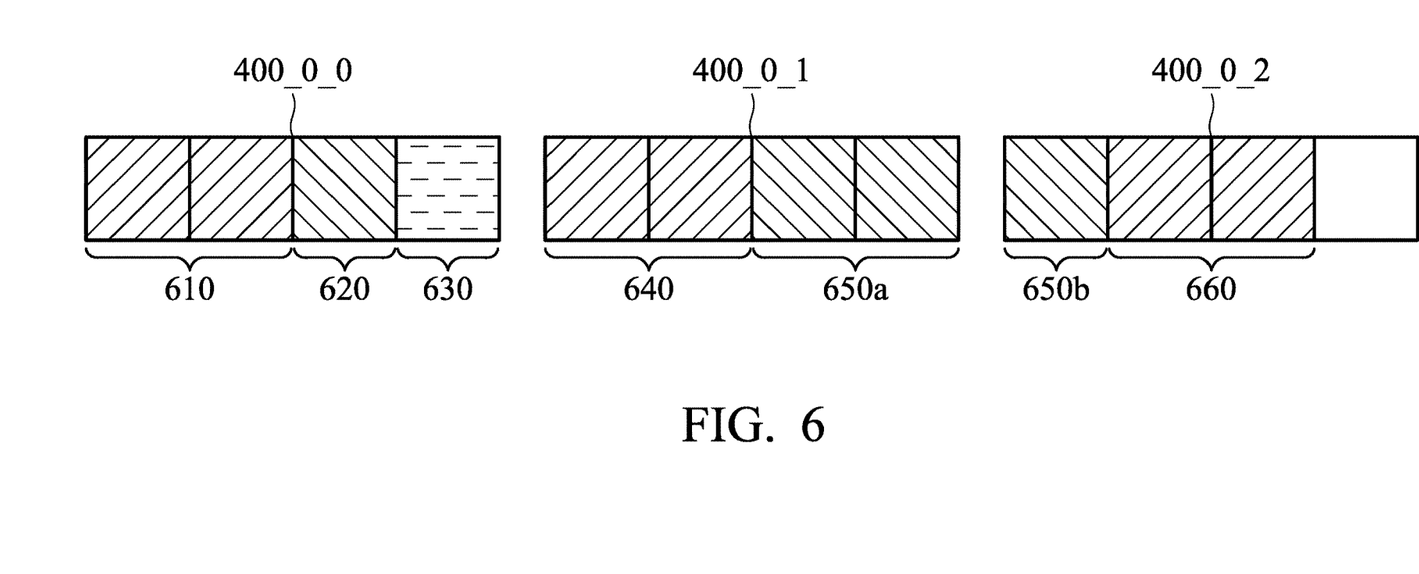
FIG. 6 is a schematic diagram for buffering data according to an embodiment of the invention.

Several examples are introduced as follows to explain the aforementioned method. Assume the host device 160 issues several commands CMD1 to the processing unit 110, which sequentially instructs the processing unit 110 to atomic-write two data units, non-atomic-write one data unit, atomic-write two data units, non-atomic-write three data units and atomic-write two data units: FIG. 6 is a schematic diagram for buffering data according to an embodiment of the invention. To deal with the first command, the processing unit 110 executes steps S550 and S570 to store two data units 610 in the first two sub-regions of the first region and modify the safe pointer to point to the end address of the second sub-region of the first region. To deal with the second command, the processing unit 110 executes steps S581 and S583 to store one data unit 620 in the third sub-regions of the first region and modify the safe pointer to point to the end address of the third sub-region of the first region. To deal with the third command, the processing unit executes step S530 and discovers that a cross-page buffering is triggered. Thus, the processing unit 110 executes steps S541 and S543 to fill dummy data 630 and direct the buffer controller 130 and the access interface 170 for programming the data 610 to 630 into available blocks of the storage sub-unit 180_0_0. Next, the processing unit 110 executes steps S545 and S570 to store two data units 640 in the first two sub-regions of the second region and modify the safe pointer to point to the end address of the second sub-region of the second region. To deal with the fourth command, the processing unit 110 executes the loop of steps S581 to S589 twice to store the first two data units 650*a* in the last two sub-regions of the second buffer region and direct the buffer controller 130 and the access interface 170 for programming the data 640 to 650*a* into available blocks of the storage sub-unit 180_0_1. Next, the processing unit 110 executes the loop of steps S581 to S589 once to store the remaining one data unit 650*b* in the first sub-region of the third buffer region and modify the safe pointer to point to the end address of the first sub-region of the third region. To deal with the fifth command, the processing unit 110 executes steps S581 and S583 to store two data units 660 in the second to third sub-regions of the third region and modify the safe pointer to point to the end address of the third sub-region of the third region.

However, the flash memory in operation may lose power exceptionally. The system architecture of the flash memory 10 contains a power-loss handling circuit 140 to repeatedly inspect whether a power loss happens. Upon detecting a power loss, the power-loss handling circuit 140 uses the remaining power to issue a command CMD4 to direct the buffer controller 130 to output data between the start address and an address, to which the safe pointer is pointing, of the current buffer region to the access interface 170, and issue a command CMD5 to direct the access interface 170 to program the received data into available blocks of the corresponding storage sub-unit.

Figure 7A:
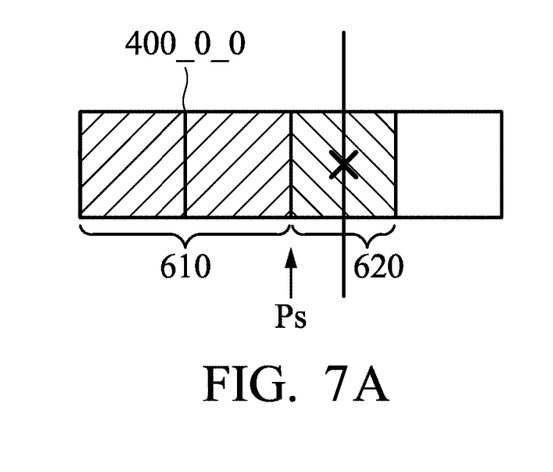
FIGS. 7A to 7D are schematic diagrams of power-loss handling according to an embodiment of the invention.
Figure 7B:
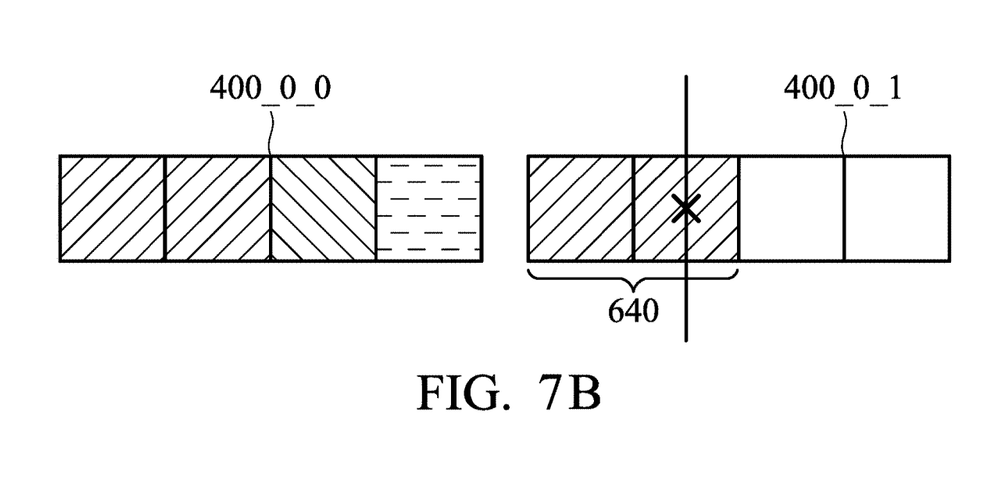
Figure 7C:
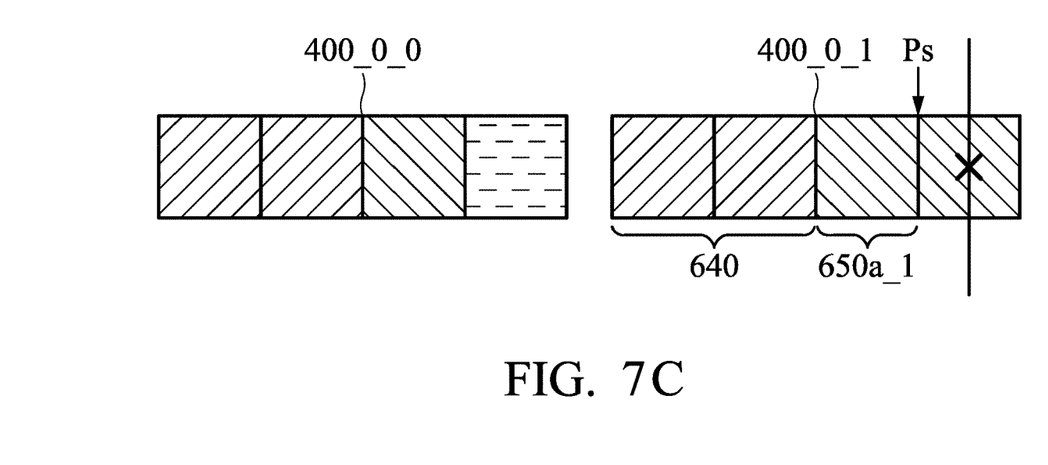
Figure 7D:
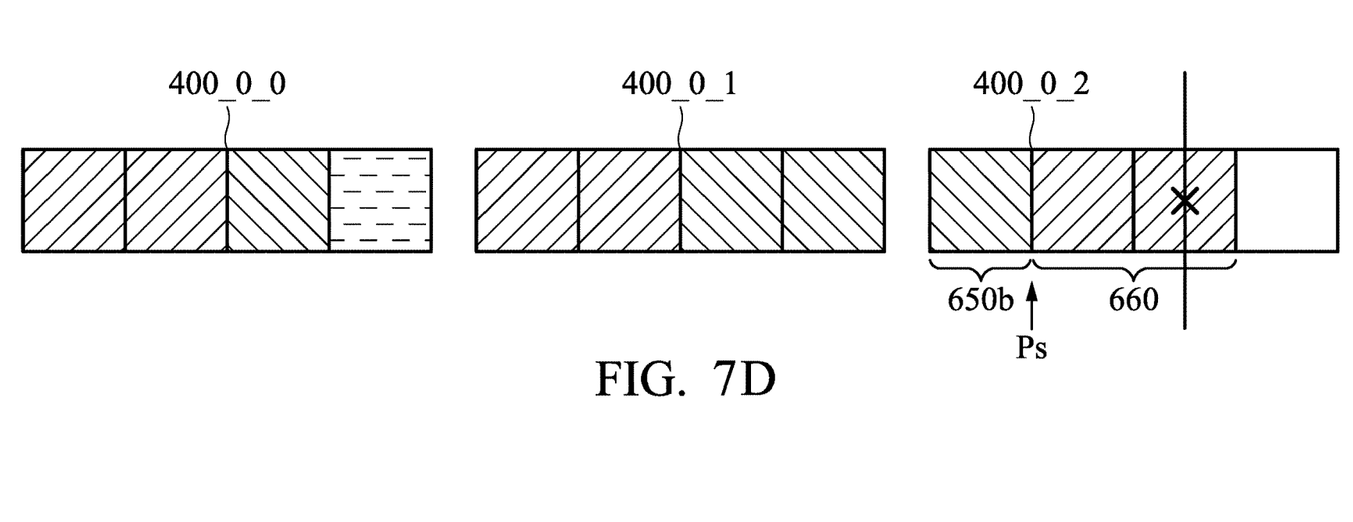

The following introduces several scenarios to explain the aforementioned power-loss handling method. Refer to the commands for buffering data as shown in FIG. 6. FIG. 7A is a schematic diagram of a power-loss handling according to an embodiment of the invention. In one scenario, the power-loss handling circuit 140 inspects a power loss during a process for the second command, issues a command CMD4 to direct the buffer controller 130 to output the data 610 between the start address and the address, to which the safe pointer Ps is pointing, of the first region to the access interface 170, and issues a command CMD5 to direct the access interface 170 to program the data 610 into available blocks of the storage sub-unit 180_0_0, thereby enabling the atomic write, which is instructed by the first command, to be successfully processed. FIG. 7B is a schematic diagram of a power-loss handling according to an embodiment of the invention. In another scenario, the power-loss handling circuit 140 inspects a power loss during an atomic write for the second data unit of the third command, and issues a command CMD4 to the buffer controller 130. However, since the safe pointer Ps has not been modified, all data of the second region cannot be output to the access interface 170, resulting in an atomic-write failure associated with the third command. FIG. 7C is a schematic diagram of a power-loss handling according to an embodiment of the invention. In still another scenario, the power-loss handling circuit 140 inspects a power loss during a non-atomic write for the second data unit of the fourth command, issues a command CMD4 to direct the buffer controller 130 to output the data 640 and 650a_1 between the start address and an address, which is pointed to by the safe pointer Ps, of the second region to the access interface 170, and issues a command CMD5 to direct the access interface 170 to program the data 640 and 650a_1 into available blocks of the storage sub-unit 180_0_1, thereby enabling the atomic write, which is instructed by the third command, to be successfully processed. FIG. 7D is a schematic diagram of a power-loss handling according to an embodiment of the invention. In the other scenario, the power-loss handling circuit 140 inspects a power loss during an atomic write for the second data unit of the fifth command, issues a command CMD4 to direct the buffer controller 130 to output the data 650b between the start address and an address, which is pointed to by the safe pointer Ps, of the third region to the access interface 170, and issues a command CMD5 to direct the access interface 170 to program the data 650b into available blocks of the storage sub-unit 180_0_2 and cause an atomic-write failure associated with the fifth command.

Although the embodiment has been described as having specific elements in FIGS. 1 to 3, it should be noted that additional elements may be included to achieve better performance without departing from the spirit of the invention. While the process flow described in FIGS. 5A and 5B includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for atomic writes in an SSD (Solid State Disk) system, performed by a processing unit, comprising:
   receiving an atomic-write command instructing to write first data whose length is less than a page length in a storage unit;
   when determining that the atomic-write command will trigger a cross-page buffering of a buffer, filling dummy data into all available sub-regions of a first region of the buffer;
   when determining that the atomic-write command will trigger the cross-page buffering of the buffer, storing the first data in a second region of the buffer; and
   after successfully storing the first data in the second region of the buffer, modifying a safe pointer to point to an end address of the last sub-region of the second region, which stores the first data.

2. The method of claim 1, wherein a length of the first region is configured as the page length and a length of the second region is configured as the page length.

3. The method of claim 1, wherein the cross-page buffering of the buffer indicates that the first data is divided and stored in the first region and the second region regularly.

4. The method of claim 1, comprising:
   after filling the dummy data into all available sub-regions of the first region of the buffer, programming data of the first region into the storage unit.

5. The method of claim 1, comprising:
   when inspecting a power loss before the first data is successfully stored in the second region of the buffer, programming none of the first data into the storage unit.

6. The method of claim 1, comprising:
   after successfully storing the first data in the second region of the buffer, receiving a non-atomic write command instructing to write second data whose length is less than a page length in the storage unit; and
   storing the second data in a sub-region of the second region, which follows the first data.

7. The method of claim 6, comprising:
   when inspecting a power loss before the second data is successfully stored in the second region of the buffer, programming data between a start address and an address, which is pointed to by the safe pointer, of the second region into the storage unit.

8. The method of claim 7, wherein the data between the start address and the address, which is pointed to by the safe pointer, of the second region comprises the first data.

9. An apparatus for atomic writes in an SSD (Solid State Disk) system, comprising:
   a buffer controller, coupled to a storage unit via an access interface; and
   a processing unit, receiving an atomic-write command from a host device, which instructs to write first data whose length is less than a page length in the storage unit; when determining that the atomic-write command will trigger a cross-page buffering of a buffer, directing the buffer controller to fill dummy data into all available sub-regions of a first region of the buffer; and when determining that the atomic-write command will trigger the cross-page buffering of the buffer, directing the buffer controller to store the first data in a second region of the buffer, wherein, after successfully storing the first data in the second region of the buffer, the buffer controller modifies a safe pointer to point to an end address of the last sub-region of the second region, which stores the first data.

10. The apparatus of claim 9, wherein the buffer controller comprises the buffer, a length of the first region is configured as the page length, and a length of the second region is configured as the page length.

11. The apparatus of claim 9, wherein the cross-page buffering of the buffer indicates that the first data is divided and stored in the first region and the second region regularly.

12. The apparatus of claim 9, wherein, after filling the dummy data into all available sub-regions of the first region of the buffer, the processing unit directs the buffer controller to output data of the first region to the access interface, and directs the access interface to program the data of the first region into the storage unit.

13. The apparatus of claim 9, wherein, when inspecting a power loss before the first data is successfully stored in the second region of the buffer, the buffer controller programs none of the first data into the storage unit.

14. The apparatus of claim 9, wherein, after successfully storing the first data in the second region of the buffer, the processing unit receives a non-atomic write command from the host device, which instructs to write second data whose length is less than a page length in the storage unit; and directs the buffer controller to store the second data in a sub-region of the second region, which follows the first data.

15. The apparatus of claim 14, comprising:
a power-loss handling circuit, coupled to the buffer controller and the access interface, when inspecting a power loss before the second data is successfully stored in the second region of the buffer, directing the buffer controller to output data between a start address and an address, which is pointed to by the safe pointer, of the second region to the access interface; and directing the access interface to program the data between the start address and the address, which is pointed to by the safe pointer, of the second region into the storage unit.

16. The apparatus of claim 15, wherein the data between the start address and the address, which is pointed to by the safe pointer, of the second region comprises the first data.

* * * * *